United States Patent [19]

Selgin

[11] 3,841,761
[45] Oct. 15, 1974

[54] METHOD AND APPARATUS FOR DETECTING FAULTS IN FABRIC

[75] Inventor: Paul J. Selgin, Bethel, Conn.
[73] Assignee: Neotec Corporation, Rockville, Md.
[22] Filed: Oct. 24, 1973
[21] Appl. No.: 409,241

[52] U.S. Cl............... 356/200, 250/239, 250/562, 250/572
[51] Int. Cl.. G01n 21/16, G01n 21/30, G01n 21/32
[58] Field of Search.................... 250/562, 572, 559; 356/200

[56] References Cited
UNITED STATES PATENTS
3,388,261  6/1968  Roberts et al. ............... 250/562 X
3,474,254  10/1969  Piepenbrink et al............ 250/562

Primary Examiner—James W. Lawrence
Assistant Examiner—T. N. Grigsby
Attorney, Agent, or Firm—Liss & Gajarsa

[57] ABSTRACT

A sensor housing is located adjacent a moving sheet of fabric. A number of adjacent inspection channels along the length of the fabric are defined, each channel being subject to fabric flaw detection by three sensors located within the housing. A single lamp in the housing serves as a light source for all sensors. A first sensor detects changes in fabric reflectance. A second sensor detects changes in fabric transmittance. A third sensor detects texture variations by responding to obstructions to light directed at grazing incidence to the fabric. Circuitry is connected to the output of the sensors for weighing the individual signals, from the sensors, and summing the results. Should the summed signals exceed a preselected threshold value, an indication is generated which corresponds to the severity of the visual-tactile flaw as detected.

10 Claims, 4 Drawing Figures

METHOD AND APPARATUS FOR DETECTING FAULTS IN FABRIC

FIELD OF THE INVENTION

The present invention relates to photo-optical measuring instruments, and more particularly to such an instrument that is employed to measure color and texture flaws in a fabric web. The method for detecting flaws includes the simultaneous detection of relfectance, transmittance and obstruction of light by the fabric, to light at grazing incidence.

BRIEF DESCRIPTION OF THE PRIOR ART

After a bolt of fabric is manufactured, it must usually be inspected for color and texture flaws or faults. Industry requirements are somewhat variable and not too clearly defined. Faults are not considered serious, unless they are "noticeable," with the ultimate requirement being acceptance or rejection by the customers. However, the ability to "notice" color and texture faults is extremely subjective. If a fabric inspector, at the plant applies his or her own experience to the visual detection of flaws, with perfectionist criteria, the inspector will notice many more flaws than the untrained customer will. Inasmuch as this would result in wasteful rejection, the inspectors must use less than perfectionist's criteria. Uniform criteria are very difficult to establish. The textile industry has catalogued 50 or 60 distinct types of faults for textiles (including woven and knit fabrics), and have graded them according to their "weight" in determining acceptability of yard goods by customers.

As high speed machinery continually improves production, it becomes increasingly difficult for human inspectors to perform their tasks with the assurance that they can detect flaws in a long fabric web. In the past, photo-optical instruments were used for detecting flaws. U.S. Pat. No. 3,388,261 discloses an elaborate photodetection scheme for detecing dye faults. U.S. Pat. No. 3,474,254 discloses a single lamp which serves as a source for two detectors that are capable of detecting limited types of fabric faults. However, neither these patents nor known existing instruments marketed today have the capability of detecting wide range texture and color faults, simultaneously, as is possible with the present invention.

BRIEF DESCRIPTION OF THE PRESENT INVENTION

The present invention is a photo-optical instrument that is simply constructed and utilizes a minimum of components which render the instrument relatively inexpensive to manufacture and extremely reliable. A single lamp source is used in conjunction with three detectors. The first detector responds to reflectance of fabric undergoing inspection. Texture and color variation will after the reflectance accordingly. A second sensor measures transmittance of light through the fabric undergoing inspection. This detection also responds to color variations and texture variations, particularly thinness and thickness. A third sensor responds to obstructions of light at grazing incidence to the fabric undergoing inspection. The sensor relating to this detection is extremely sensitive to texture faults, such as knots and substantial variation in thickness or thinness. In actuality, the three sensors are connected to circuitry that develops five output signals corresponding to texture-color variations. The five signals appear simultaneously, and are given weight factors by additional circuitry. Thus, certain faults, such as color variations and the detection of holes will have a greater effect on the final measurement, than other types of flaws, such as knots. A summation circuit is provided to sum the individual sensor outputs, that undergo multiplication by respective weight factors, determined by inspection experts. Should the eventual summed output exceed a preselected threshold, an indication of this event is recorded by marking the place where the flaw occurs. As a result of the summation process, a particular flaw may be detected by two or three sensors. Thus, the larger and more objectionable the flaw is, the more it will have an effect upon the sensors. This will result in a large output from the summation circuitry thus insuring detection of all flaws in the fabric web.

The above-mentioned objects and advantages of the present invention will be more clearly understood when considered in conjunction with the accompanying drawings, in which:

DETAILED DESCRIPTION OF THE INVENTION

Figure 1:
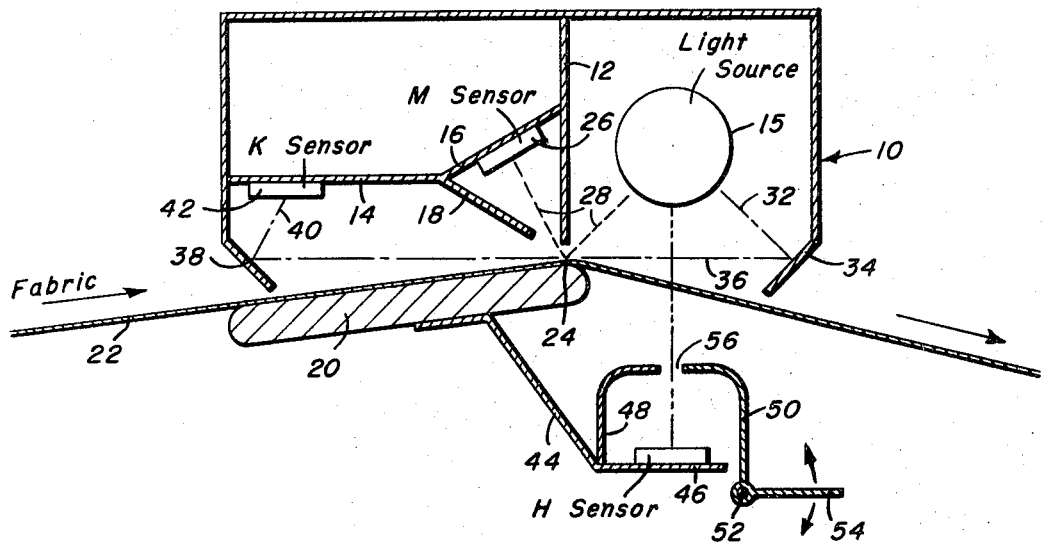
FIG. 1 illustrates an interior view of a housing that includes the photo-optical components of the present invention. These sensors are shown in relation to a fabric web.

Referring to the figures and more particularly FIG. 1 thereof, reference numeral 10 generally denotes a housing that contains most of the photo-optical components of the invention. The interior of the housing is painted white to permit light reflections along predetermined paths, as will be explained hereinafter. Further, the white surfaces insure a more even distribution of light through an instantaneous fabric area being inspected. A first vertical wall 12 serves as a partition between the right end of the housing and the left end thereof, as viewed in FIG. 1. A horizontal partition 14 is connected between the left end wall of the housing and a bifurcated partition assembly including partitions 16 and 18. The partition 16 is connected between the right end of the horizontal partition 14 and the vertical partition 12. The outward end of partition 18 is unsupported. The purpose of the partitions is to optically isolate the photo-detectors mounted to respective partitions. The lower end of the housing 10 is opened thereby exposing a length of moving fabric web 22 that is temporarily supported upon a support bed or plane 20 that is characterized by a low friction surface such as chrome-plated polished steel. The plane 20 is inclined so that the fabric web 22 is fed upwardly toward the lower end of the partition 12 which is located just above a high point on the plane 20. After this high point, the fabric web 22 continues downwardly. The fabric is held against the plane by very light pressure, due to the shallow angle of inclination. This plane is used in preference to rollers because the latter introduces effects of roller eccentricity.

In order to detect flaws in a fabric web, it is necessary to inspect the entire width of the fabric. This may be done with a scanning arrangement. However, the present invention utilizes stationary photo-optical components to insure consistently accurate inspection over a relatively long period of time, without the necessity of mechanical adjustments. Accordingly, the width of the fabric web is considered to comprise a number of adjacent segments or channels. Each light source and associated sensors, are associated with one channel. Thus, if the components in FIG. 1 were shown in an orthagonal view, or perspective view, a number of photo-optical sets as illustrated in FIG. 1 would be seen to be lined up in adjacent relationship. Each set of photo-optical components comprises a channel that is associated with a corresponding channel being inspected, on the fabric web itself. A channel occupies a small part of the width of the fabric web. Particularly, the dimension of a channel is in the order of one inch so that the total number of channels for standard fabric width might vary between 50 and 100 depending on the degree of sensitivity desired.

In order to facilitate the explanation of the invention, FIG. 1 illustrates the photo-optical components relating to a single channel. The light source 15 cooperates with three sensors positioned on an opposite side of the vertical partition 12. The source, by way of example only, may be a number 82, 6-volt bulb. In actuality, all bulbs from the various channels may be connected in series and DC operated at about one-half rated voltage. The source 15 creates three light paths between the fabric web 22 and the three respective sensors. Each of these light paths is produced from the single light source 15, the three paths intersecting the surface of the fabric web 22 at the high point 24.

The first sensor 26 is denoted as the M sensor, and is positioned on the underside of the partition 16, in optical communication with the high point 24. The first obstacle path indicated by reference numeral 28 is a reflected light path. The receiving sensor 26 detects the reflectivity of the fabric that is positioned at the high point 24, at a given instant of time. The reflected light will vary with changes of color and texture. By way of example, the sensor 26 may be of the VACTEC type, 313L, a fast-response cadmium selenide. The sensor 26 receives light reflected by a narrow area of fabric at the high point 24, the area being of the order of 0.04 inches in length, the length being parallel to the direction of fabric web flow.

Design of the sensor 26 and its surrounding light-reflecting surfaces is dictated by two primary criteria:

1. Light should be directed to the sensor 26 only through reflection from a well defined area of the fabric, and not through reflection from the sensor structure itself, or from outside illumination.
2. The defined fabric area should receive and reflect light over a fairly large angle.

Criterion 2, above, is of particular importance. If there is, for example, an unwanted white thread woven into a dark blue fabric, and if the white thread is thicker than the blue thread, aside from reflecting more light due to its color, the white thread will also cast a shadow. If this defect is illuminated over a restricted angle and reflected light is likewise picked up over a restricted angle, the shadow effect will be emphasized, and the whiteness effect will be nullified or at least it will have a subtractive effect upon the detection of the color fault. Although another sensor 46 detects changes of color due to stains or other discoloration, the resolution required to pick up the color change of a single thread requires excessive, impractical resolution. The shadow effect by the thicker white thread is minimized by wide angle illumination and reflection. This design criterion is compatible with the viewing of a narrow area by adjusting the dimensions shown in FIG. 1, and preparing the interior surface of the housing 10 with a white coating.

The occurrence of the above discussed thick white thread is a flaw that is noticeable, apart from color, both to the eye and to the touch. This textural flaw is detected, not only by the sensor 26, but also by a second sensor 42 which is positioned on the underside of the partition 14. This sensor picks up light grazing over the surface of the fabric web 22 when it reaches the high point 24. The sensor 42 detects thickness variations, or the sudden appearance of knots or extra threads. The detection process with respect to the sensor 42 (K sensor) will now be discussed.

Light source 15 directs light along an initial path 32 toward a reflection point 34, at the lower interior portion of the housing 10. The light is diffused after reflection and is directed horizontally along path 36, to intersect the high point 24. Path 36 continues to the left until the light is reflected from point 38, an interior point of the housing, oppositely disposed in relation to the reception point 34. After reflection from point 38, the light is directed toward the K sensor 42. Thus, as will be appreciated, should thickness variations in the fabric appear when the fabric web passes high point 24, there will be an obstruction of the reflected light along light path 36, thus resulting in a detection variation at sensor 42. It will be noted that the presence of the two diffusing surfaces at points 34 and 38, permits illumination of both sensors 26 and 42 from a single light source 15.

A third sensor, denoted the H sensor 46 is positioned beneath the web 22 on an angle bracket 44 attached to the bottom of the support bed 20. A light shield 48 cooperates with a second moveable shield 50 to produce an adjustable slit 56 which permits the passage of light from the source 15 and through the fabric web 22, to be detected by the sensor 46. The light passing from the light source 15 to the sensor 46 is along a path passing through the bottom of the housing 10, at a point to the right of the high point 24. The moveable shield 50 is pivoted at 52 and may be caused to move actuation of lever arm 54. Adjustment of the lever arm 54 causes the slit 56 to increase or decrease in size. The choice of position depends upon the overall fabric transparency. For example, knit goods are much more transparent than denims and if settings for these respective fabrics were not altered, the photo sensor 46 would be exposed to either too much or too little light passing through the fabric web 22. The H sensor 46 detects holes or thin spots where light transmission is increased, as well as opaque spots where it is decreased. As will be appreciated, many of the textural faults will be detected by both sensors 46 and 42. The outputs from these sensors are summed cumulatively as explained hereinafter thereby maximizing the detection of textural faults in the fabric.

Figure 2:
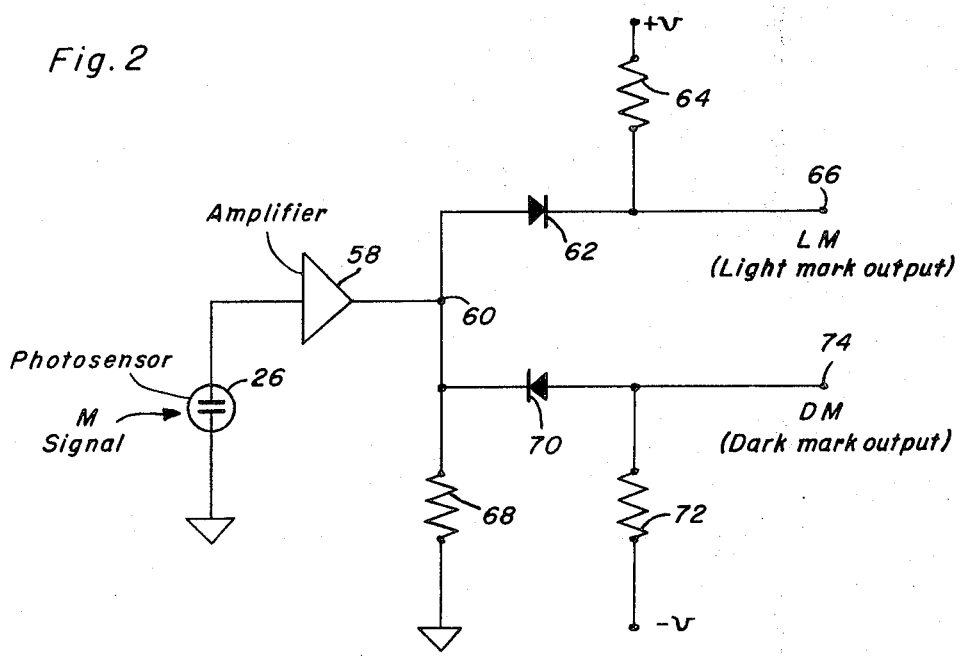
FIG. 2 is a electrical schematic diagram of a clamping circuit that operates upon the output of a photodetector, so that detection of only threshold signals is accomplished.

FIG. 2 illustrates a clamping circuit, associated with each sensor of each channel. For purpose of example, the sensor 26 is indicated. The M signal (reflected light) impinging upon the sensor 26 generates a signal that is amplified by 58. The output from amplifier 58 establishes a junction point 60. To the junction point is connected the anode of a diode 62. The cathode of this diode is connected to a positive bias voltage supply through a resistor 64. Due to the polarity reversal of the sensor signal, through amplifier 58, an output lead 66 will become energized when high values of reflecte light are detected. This signals the occurrence of light marks. Otherwise stated, a defect in color has been detected whereby color lighter than required has been detected by sensor 26. The junction point 60 is connected to the cathode of a reversely connected diode 70. The cathode of diode 70 is also connected to a grounded resistor 68. A resistor 72 is connected between the anode of the diode 70 and a negative voltage bias supply. An output is connected to the anode so that if negative-going pulses appear at the junction point 60, after phase reversal by amplifier 58 an output signal will be developed at output lead 74 to indicate an inspected fabric area that has a color darker than the required color. However, due to the bias diode 70 as well as the bias diode 62, the output at 66 and 74 will only occur when respective positive and negative going pulses are above and below clamping or threshold levels. As a result, outputs from FIG. 2 will not occur until a preselected degree of discoloration is present. It is noted that the circuitry associated with photo sensor 26 provides two flaw outputs 66 and 74. A similar situation exists for the H sensor 46. As in the case of the circuitry shown in FIG. 2, identical circuitry (not shown), associated with sensor 46, generates signals exceeding threshold values for excessively opaque or excessively thin spots. Thus, outputs are provided for an additional two flaws. The output from the K sensor 42 need only be amplified by an amplifier such as 58, without the addition at the output thereof of a clamping circuit as shown in FIG. 2. This is due to the fact tha information from the sensor 42 is only desired when light is interferred during grazing incidence. Thus, a total of five flaw outputs are provided by the circuitry associated with the sensors 26, 42 and 46.

Figure 3:
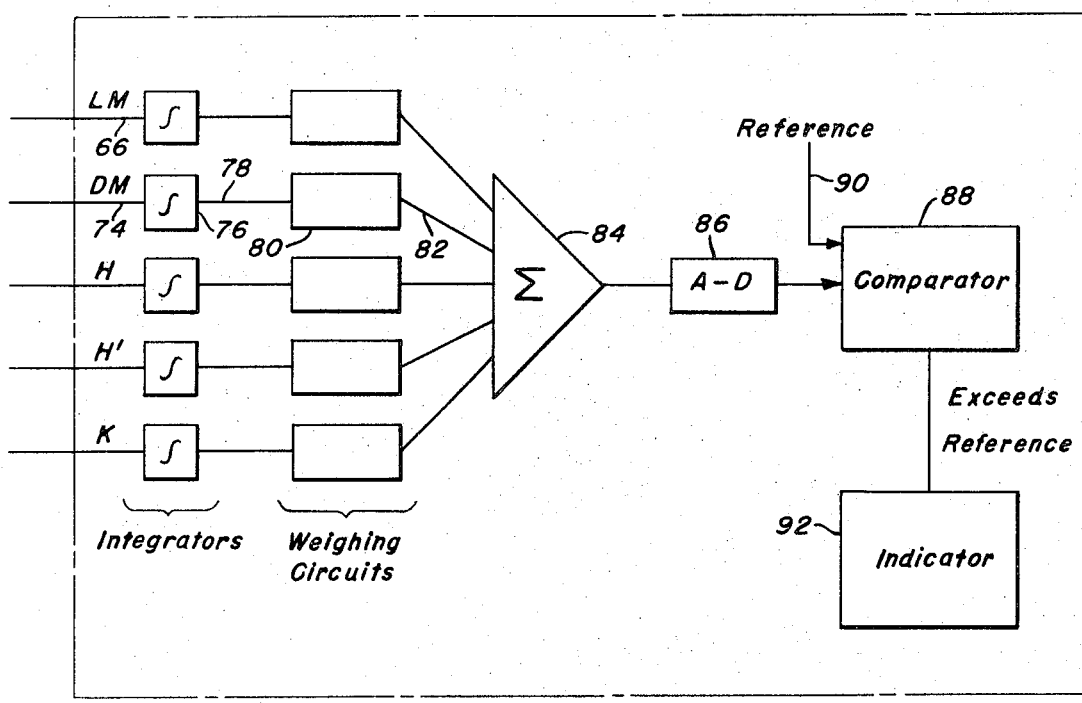
FIG. 3 is a block diagram of a utlization circuit which operates upon the inputs from the detectors for weighing the detector output and summing these outputs for a final summation signal that corresponds with the overall color-tactile impact of a flaw.

FIG. 3 illustrates a utilization circuit that combines the five flaw outputs previously discussed. The five flaw signals generated by the detectors and their associated circuits may be considered individually by recording their occurrences or by signaling indicators should particular flaws having excessive magnitudes, be detected. However, in the preferred embodiment of the present invention, the five outputs are complementary but not redundant. More particularly, they are provided as parallel inputs to the utilization circuit which performs an integration of each output signal accompanied by subsequent multiplication by a respective weight factor. After the five output signals have undergone this multiplication, there is a cumulative summation of the signals which is compared to a threshhold value. Should the threshold be exceeded, an appropriate indication is made of this fact. Needless to say, should the five flaw outputs indicate a flaw constituting both color and textural defects, the final utilization circuit output will indicate this.

Discussing the utilization circuit, of FIG. 3, in greater detail, each of the five flaw outputs is connected to the input thereof. The LM and DM inputs 66 and 74, respectively, indicate light and dark discoloration, as shown in FIG. 2. The H and H' inputs relate to the detection of thin spots and opaque spots, respectively. The K input signals the detection of an obstruction of grazing light to the K sensor 42 which indicates a textural defect. When this occurs, the K line is energized. Each of the inputs will undergo respective, parallel signal processing. For example, the input 74 undergoes integration through an individual integrating circuit 76. The output from the integrator 76 occurs along lead 78 that drives an individual weighing circuit 80. Each of the weighing circuits multiplies a signal provided at the input thereof by a factor which relates to the importance of the flaw that the particular weighing circuit is associated with. Accordingly, the defect that has the greatest impact, namely a hole, will have the greatest weighing factor. The other flaw inputs are multiplied by their respective weighing factors, in accordance with the selection of inspection experts. The integrators 76 as well as the weighing circuit 80 are of conventional types, and are not, per se, novel in themselves. For example, the integrators may comprise LC components while the weighing circuits may comprise voltage dropping resistors that generate voltages thereacross, corresponding with particular weighing factors.

After the flaw signals have undergone integration and multiplication by weighing factors, they are combined along input lead 82 to a summation circuit 84, that may be of a conventional analog type including resistive networks. The output from the summation circuit 84 is fed to an analog to digital converter 86 where the analog signal is converted to a digital format. These converters are widely available as integrated circuits. The output from the converter is fed to a digital comparator 88 which compares the output from the converter 86 to a reference digital value at 90. Digital comparators consist of logic circuits, usually reduced to integrated circuits, and are widely available on the market. The comparator output is energized when the converter produces an output which exceeds the reference at 90. This occurrence signals the detection of a flaw that exceeds preselected limits. The flaw may either be of the color or textural type, or both. An indicator 92 of any conventional type indicates this occurrence visually or on a time data recording. The indicator 92 may also include a marking device which places a mark on the fabric web, at a point along its length, where the fault is detected.

A special difficulty arises in fault detection of patterned goods. As a rule, woven and printed patterns produce strong signals from both the M sensor 26 and the H sensor 46 due to the pattern itself-absent faults.

Figure 4:
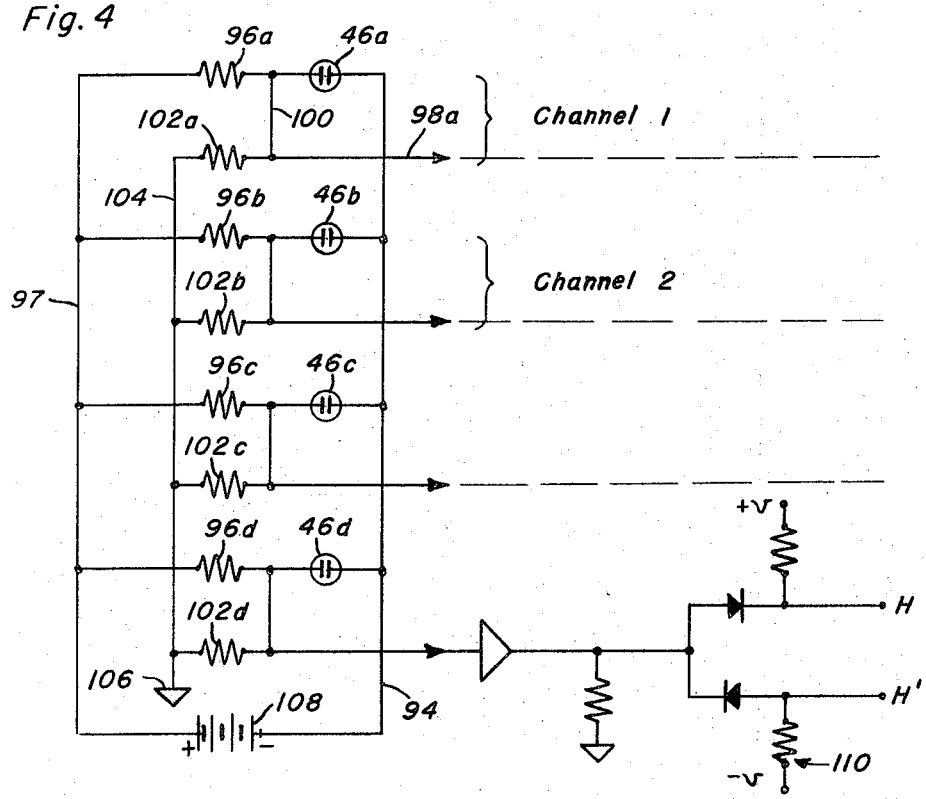
FIG. 4 is a schematic diagram of a compensation circuit which eliminates or reduces the background signal in fault detection on certain fabric patterns.

The compensating circuit shown in FIG. 4 is useful in the detection of color and textural faults for certain types of patterned fabrics. The compensating circuit is designed to eliminate the background signal caused by patterns of these certain fabric types. The compensating circuit will not work for all patterns. It will eliminate only background signals caused by stripes (generally woven but possibly printed) running along the width of the fabric. It is effective on plaid patterns because the transverse stripes are those that produce changes in the output of the detectors, hence the resulting background signal. The lengthwise stripes also have an effect, but to a lesser extent. Basically, the circuit shown in FIG. 4 measures differences between the output of a given channel and the average of several adjoining channels. Stripes will affect this group of channels similarly and therefore do not contribute to a difference signal. However, a localized flaw will show up as a difference signal. It should be stressed that the compensating circuit may not work for certain patterns, and that it should be used in addition to the uncompensated output, due to the possible presence of faults running along the width of a fabric, which will show up only as uncompensated signals. It should also be noted that the woven patterns are more apt to have faults detectable by the H sensor 46 rather than those detectably by the M sensor 26. This is due to the fact that marks due to color difference are much less visible in patterns. Another reason for this is that in woven patterns the weaving is more complicated and weaving defects are more prevalent as the result. This is also true of knit patterns, when compared with solid colors and printed patterns. Weaving defects will show up strongly in signals generated by the H sensor 46, regardless of pattern.

Considering the structure and operation of the circuit, reference is made to FIG. 4 wherein a number of H sensors are indicated by 46a, 46b, 46c, 46d. Only four sensors are illustrated, byway of example only, to illustrate a compensation circuit for four adjacent channels. A bus line 94 connects one terminal of each detector, in parallel. Resistors are connected between the other terminal of each sensor and a bus line 97. The resistors, being of equal value, are denoted as 96a, 96b, 96c, and 96d. The output from each channel is denoted, as indicated for channel 1, by 98a. The output lead 98a is connected to the junction between resistor 96a and sensor 46a, via a connecting lead 100. The connecting lead 100 is then connected to a bus line 104, through a resistor 102a. The bus line 104 similarly connects resistors 102b, 102c and 102d in a similar manner to respective sensors. The lower end of the bus line 104 is connected to a common while the bus lines 94 and 97 are respectively connected to the negative and positive terminals of battery 108. The output from each compensating circuit is then connected to a clamping circuit 110, in the manner previously described in connection with FIG. 2.

Accordingly, from the above description of the invention, the outstanding features of this invention should be appreciated. Due to the superior capability of the invention, a point on the fabric web 22, having multiple flaws, is detected by several sensors simultaneously, and the signals therefrom are added simultaneously to generate a final signal of greater significance than the signals from individual sensors, thus creating a cumulative signal (at 84-FIG. 3) which corresponds to the visual-tactile impact of the point where multiple flaws exist.

It should be understood that the invention is not limited to the exact details of construction shown and described herein of obvious modifications will occur to persons skilled in the art.

What is claimed is:

1. A method for detecting color and textural defects in a sheet of moving material comprising the following steps:
    subjecting a preselected inspection area of the sheet to transmitted light incident to the sheet in a direction substantially perpendicular to the sheet;
    detecting the light passing through the preselected area of the sheet which varies according to excessive thinness or thickness of the material in the area and producing a first corresponding detection signal;
    subjecting the preselected area of the sheet to light at an acute angle of incidence for causing the reflection of light from the area;
    detecting the reflected light which varies in response to color and textural faults in the area and producing a second corresponding detection signal;
    subjecting the preselected area of the sheet to light impinging at a grazing angle;
    detecting the grazing light which varies in response to textural obstructions present in the area and producing a third corresponding detection signal;
    individually integrating the first, second and third signals; and
    summing the first, second and third signals, simultaneously to produce an output signal corresponding to the color-tactile impact of one or more detected defects in the preselected area at a single time instant.

2. The method of claim 1 together with the step of multiplying each detection signal by a separate weight factor prior to summing, thus ascribing relative importance between the detection signals.

3. The method of claim 2 together with the step of comparing the output signal after summing, with a reference corresponding to an acceptable color-tactile defect level, for generating an indication when the output signal exceeds the reference.

4. A system for detecting flaws in moving sheet material, the system comprising:
    a housing located on one side of the sheet and having an open end positioned adjacent the moving sheet;
    at least one source located in the housing for directing light toward a preselected area of the sheet;
    first sensing means located on a side opposite the sheet for responding to light transmitted through the preselected area which varies in accordance with thin and thick spots in the area;
    second sensing means located within the housing and in proximity to the preselected area for detecting light reflected from the area which varies in accordance with color and textural variations appearing in the area;
    third sensing means located within the housing and in proximity to the preselected area for detecting light grazing along the preselected area which varies in accordance with textural obstructions appearing in the area;
    and means respectively connected to the sensing means for making individual detection signals available for utilization.

5. The subject matter as set forth in claim 4 together with a separate amplifier connected to each connecting means for amplifying the detection signals; and
    circuit means connected to the amplifier for gating the detection signal to an output of the circuit means only when the detection signal exceeds a preselected threshold level, indicating a respective detected fault exceeding an acceptable limit.

6. The subject matter of claim 5 wherein a plurality of circuit means are provided for respective detection signals, and further wherein the outputs of the circuit means are cumulatively combined by utilization means for producing a signal indicative of the overall color-tactile impact of a fault or faults appearing in the area at a given instant of time.

7. A system for detecting flaws in a moving fabric web, the system comprising:
 a plane for supporting the web, a preselected area in the plane defining an area where the fabric is inspected for faults, the area being divided into a plurality of adjacent channels;
 a housing located on one side of the web and having an open end positioned adjacent the inspection area;
 a plurality of identical photo-optical means consituting photo-optical inspection channels corresponding with the channels defined in the inspection area;
 each photo-optical channel including:
 a single source of light positioned in the housing;
 first sensing means located on an opposite side of the web for responding to light transmitted through the inspection area by the source, which varies in accordance with thick and thicn defect spots in the fabric as they appear in the area;
 second sensing means located within the housing and in proximity to the inspection station for detecting light reflected from the area which varies in accordance with color and textural variations of the fabric as they appear in the area;
 at least one interior portion of the housing having a reflective surface for reflecting light from the light source at a grazing incident angle to the inspection area;
 third sensing means located within the housing and in proximity to the preselected area for detecting the grazing light passing by the inspection area, the detected light varying in accordance with textural obstructions formed in the area; and
 means respectively connected to the sensing means for making individual detection signals available for utilization.

8. The subject matter of claim 7 together with a separate amplifier connected to each connecting means for amplifying the detection signals; and
 circuit means connected to the amplifier for gating the detection signal to an output of the circuit means only when the detection signal exceeds a preselected threshold level, indicating a respective detected fault exceeds an acceptable limit.

9. The subject matter set forth in claim 8 wherein a plurality of circuit means are provided for respective detection signals, and further wherein the outputs of the circuit means are cumulatively combined by utilization means for producing a signal indicative of the overall color-tactile impact of a fault or faults appearing in the area at a given instant of time.

10. The subject matter set forth in claim 8 together with:
 means connected to the circuit means for integrating the output of each circuit means;
 means connected to the integrating means for multiplying the output from each integrating means by separate weight factors thus ascribing relative importance between the individual detection signals;
 means connected to the outputs of the multiplying means for summing the multiplied outputs and providing a summation signal therefrom; and
 means for comparing the summation output with a reference corresponding to an acceptable color-tactile defect level and generating an output therefrom, when the summation output exceeds the reference.

* * * * *